May 1, 1956 D. A. GUSTAFSON 2,743,665
WAFFLE BAKER

Filed May 2, 1952 2 Sheets-Sheet 1

INVENTOR.
David A. Gustafson
BY
Karl H. Sommermeyer
Atty.

May 1, 1956 D. A. GUSTAFSON 2,743,665
WAFFLE BAKER
Filed May 2, 1952 2 Sheets-Sheet 2
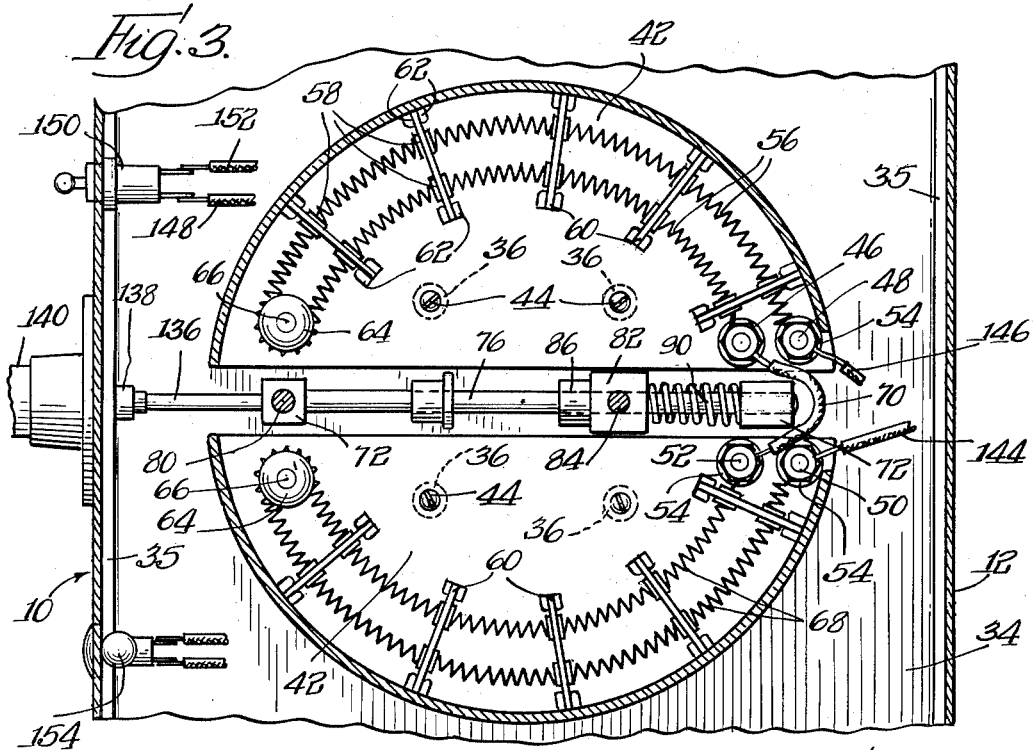
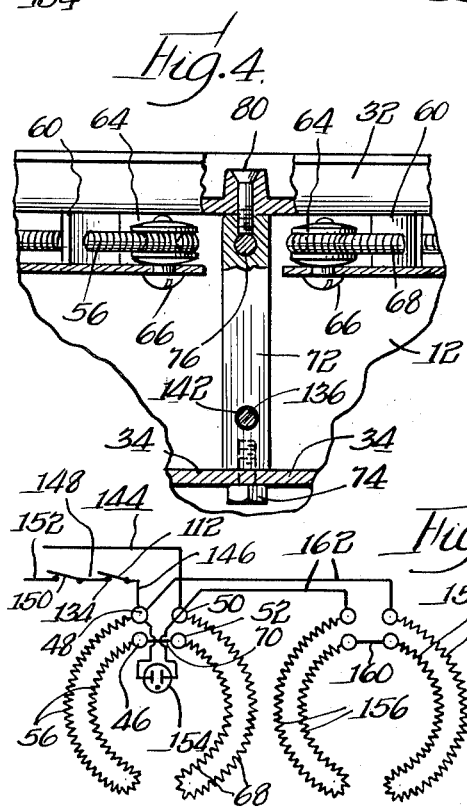
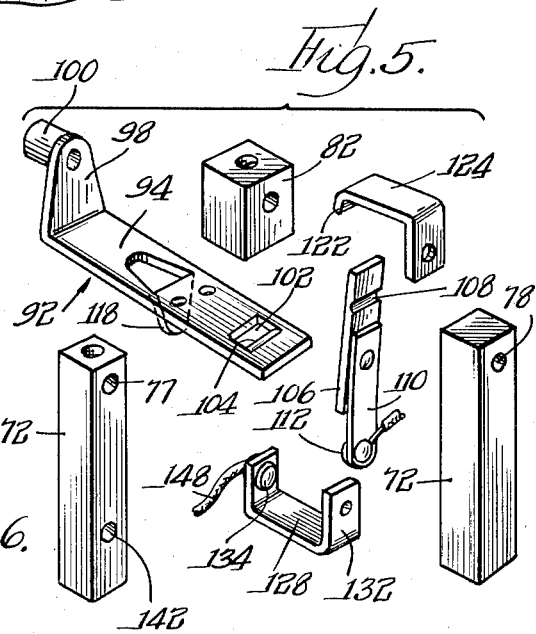
INVENTOR.
David A. Gustafson
BY
Karl W. Sommermeyer
Atty.

United States Patent Office 2,743,665
Patented May 1, 1956

2,743,665

WAFFLE BAKER

David A. Gustafson, Elgin, Ill., assignor to McGraw Electric Company, Elgin, Ill., a corporation of Delaware Application May 2, 1952, Serial No. 285,716

10 Claims. (Cl. 99—331)

This invention is concerned with waffle irons or similar cooking utensils wherein the grid or other cooking plate serves as one element of a thermostatic control.

In cooking batter to form waffles or the like it is necessary to treat the grids or other cooking plates to prevent adherence of the cooked batter thereto. At one time grids or plates were treated or seasoned with grease and it was necessary to repeat the seasoning each time the grids or plates were washed. Present-day waffle grids are never greased. Instead, they are coated with a silicone compound which is baked on. In domestic use, the baked on silicone coating may last for many years, but in commercial use the silicone coating has to be renewed from time to time. The grids must be removed and returned to the manufacturer for the renewal of the silicone coating.

Waffle grids and similar cooking plates generally are made of aluminum or aluminum alloys which have relatively high coefficients of thermal expansion and relatively high coefficients of thermal conductivity. The high thermal conductivity of the grids causes the grid temperature to vary according to the degree which the batter on a grid has been baked. Accordingly, the temperature of the grid can be used as an indication of how well done the waffle or the like is. This, together with the high thermal expansion of the grid, has evoked the proposition of using a waffle grid or similar cooking plate as one element of a thermostatic control for the waffle iron or the like.

The necessity of removing waffle grids for renewing the silicone compound thereon when the grids are used as portions of thermostatic controls has been most troublesome in that electrical connections have had to be disrupted and restored, and thermostatic controls have had to be recalibrated.

An object of this invention is to provide an improved waffle iron with a removable grid forming a part of a thermostatic control mechanism, wherein the grid is positively connected to the remainder of the thermostatic control mechanism but is separable therefrom without disturbing the remainder of the mechanism.

Another object of this invention is to provide an improved waffle iron having a removable grid forming a part of a thermostatic control mechanism wherein the thermostatic control mechanism is exceptionally rugged.

A further object of this invention is to provide a waffle iron having a removable grid forming a part of a thermostatic control mechanism wherein the grid is supported by the remainder of the thermostatic control mechanism, but is readily separable therefrom.

A specific object of this invention is to provide a waffle iron having a grid removably bolted to a portion of a thermostatic control mechanism, the grid forming the remainder of the thermostatic control mechanism.

Other objects and advantages of the present invention will be apparent from the following description when taken in connection with the accompanying drawings wherein similar numerals are used to identify similar parts throughout and in which:

Fig. 3 is a horizontal sectional view along the line 3—3 of Fig. 2 with the grid removed;

Fig. 4 is a vertical cross-sectional view along the line 4—4 of Fig. 2;

Fig. 5 is an exploded perspective view showing the parts of the thermostatic control mechanism exclusive of the grid; and Fig. 6 is a schematic wiring diagram of the waffle baker.

Figure 1:
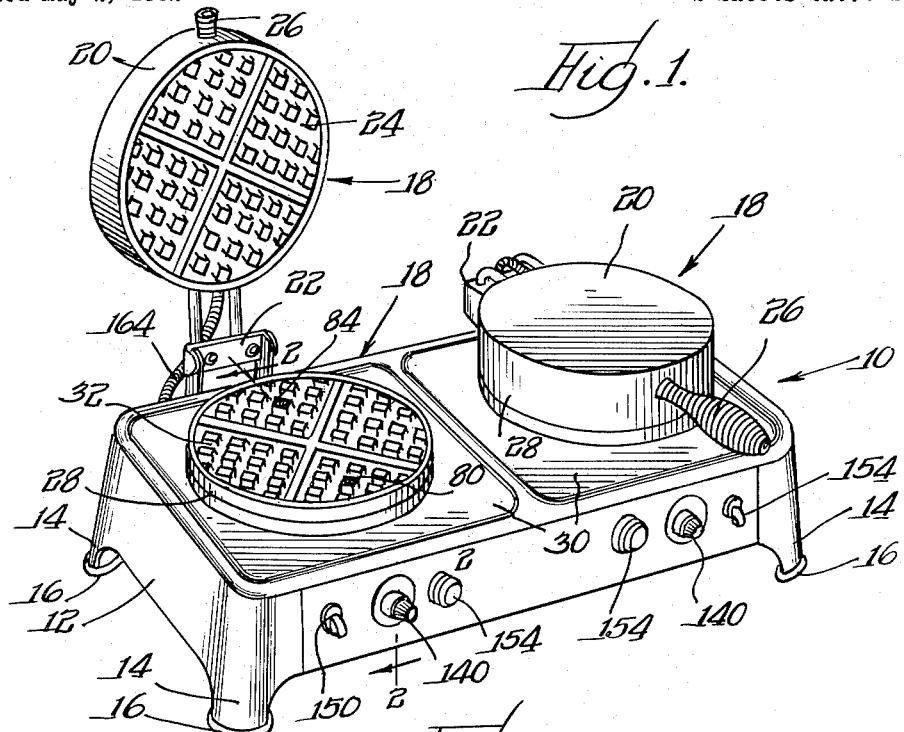
Fig. 1 is a perspective view of a commercial type waffle baker embodying the principles of my invention.

A waffle baker 10 embodying the principles of my invention is shown in Fig. 1 and includes a substantially rectangular, sheet metal base 12 having depending legs 14 at its four corners. The legs preferably are provided with feet 16 of rubber or other protective material to prevent marring of a supporting surface. The waffle baker 10 has two waffle baking units 18. The waffle baking units are of identical construction, and accordingly only one will be described. Identical numbers are used to identify the corresponding parts of the two waffle baking units 18.

Each waffle baking unit 18 includes a lid 20 hinged to the base 12 at 22. A waffle grid 24 of aluminum or aluminum alloy is secured in the lid in any desirable manner so as to be readily separable from the lid and an electrical heating unit therein. The lid 20 is provided with a handle 26 which may be of heat insulating material or of spiral wire construction designed to dissipate heat rapidly into the air.

The top of the base 12 is provided with a pair of apertures defined by rims 28 upstanding from a pair of depressions 30 in the top of the base. A waffle grid 32 fits in the aperture defined by each rim 28 and is secured in place as will be brought out presently.

A sheet metal floor 34 extends across the interior of the base 12 and is provided with flanges 35 along its edges. The flanges are spot welded or otherwise fixed to the side walls of the casing 12. Four posts 36 (Figs. 2 and 3) extend upwardly from the floor 34 to which they are fixed by suitable means such as nuts 38 threaded on reduced end portions 40 extending through apertures in the floor 34. Metal plates 42 each of which is slightly less than a semicircle in extent are mounted on top of the posts 36 by means such as screws or bolts 44 fitting through the plates and threaded into apertures in the upper ends of the posts 36. The plates 42 are spaced from the grid 32 by flanges 43 on the grid to leave room for electrical heating elements on the plates 42 in proximity to the grid.

Bolts and nuts 46, 48, 50, and 52 extend through the plates 42 and are insulated therefrom by suitable spacers 54 of mica or other heat resisting electrical insulation as is well known in the electrical arts. An electrical heating element in the form of a resistance coil 56 extends between the nuts and bolts 46 and 48 and is supported by metal grommets 58 in spacers 60 consisting of sheets of mica or other heat resistant electrical insulation. The mica sheets 60 are supported on the plates 42 by pairs of fingers 62 struck up from the surfaces of the plates and embracing the sheets. The heating coil 56 further is supported by an insulator 64 (Figs. 3 and 4) of porcelain or similar heat resistant material mounted on a stud 66 fixed in the plate 42.

A similar heating coil 68 (Figs. 3 and 4) extends between the nuts and bolts 50 and 52 and is supported by additional mica spacers 60 and another porcelain insulator 64 on a stud 66. A wire 70 is connected between the nuts and bolts 46 and 52 to place the coils 56 and 68 in series. The remainder of the wiring will be discussed later with reference to the wiring diagram of Fig. 6.

Figure 2:
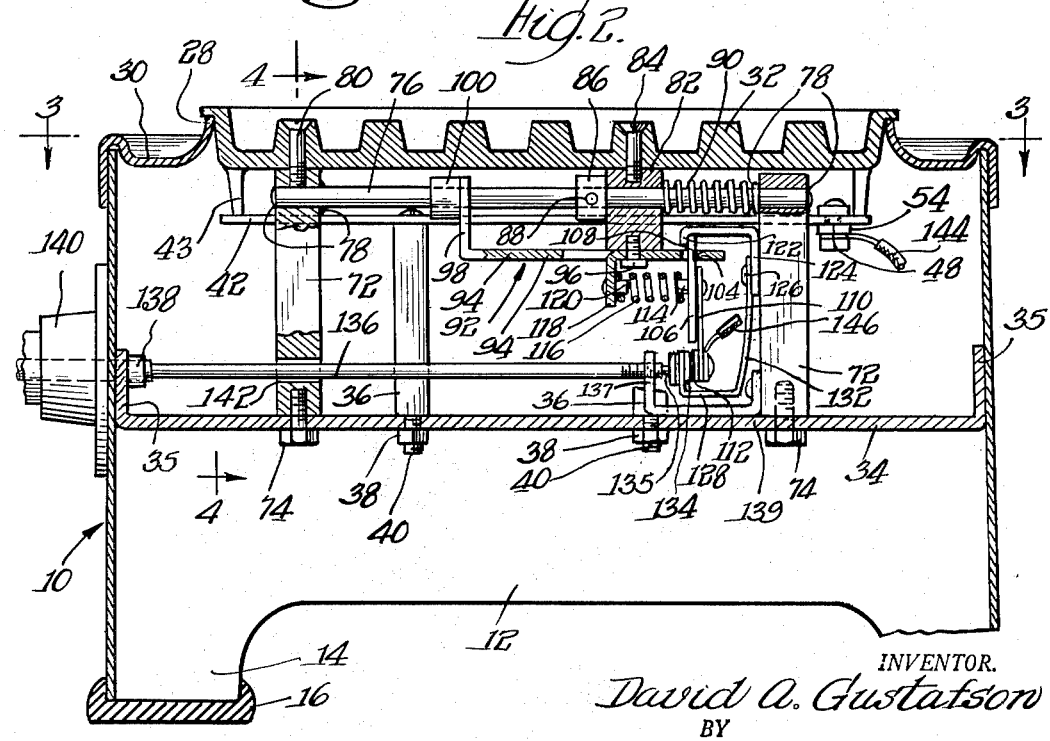
Fig. 2 is a cross-sectional view of the waffle baker taken along the line 2—2 of Fig. 1.

A pair of support or reference posts 72 (Figs. 2–5) is fixed to the floor 34 by bolts 74 extending upwardly through the floor and threaded into the posts. A rod 76 of metal having a very low coefficient of expansion such as "Nilvar" fits in transverse apertures 77 in the reference posts 72 and is fixed to the reference posts by welding or brazing 78 or by any other suitable or desirable means. A screw 80 passing through a suitable aperture in the grid 32 is threaded into the forward post 72 (the left post as seen in Fig. 2).

A temperature controlling bearing 82 in the form of a rectangular block which preferably is made of graphite bronze slidingly fits over the "Nilvar" rod 76 and is fixed to the grid 32 by a screw 84 passing through a suitable aperture in the grid at a predetermined spaced distance from the screw 80 and threaded into the temperature controlling bearing 82. The grid 32 thus is supported in part by the reference posts 72, the rod 76, and the bearing 82. The bearing 82 is positioned somewhat closer to the rear reference post 72 than to the front reference post. A stop or collar 86 is slidable on the rod 76 and is fixed in position against the reference bearing 82 by a set screw 88. A heavy coil spring 90 encircles the rod 76 and is trapped between the reference bearing 82 and the rear reference post 72 to urge the bearing 82 against the collar or stop 86. The collar 86 determines the spacing between the front post 72 and the bearing 82 before the grid is installed. This spacing preferably is predetermined to permit the grid to be attached at room temperature, say 70° F. The apertures accommodating the screws 80 and 84 are oversized to take care of tolerances allowed in the spacing of these apertures in the grid.

A switch assembly bracket 92 is mounted on the reference bearing 82 and includes a substantially flat metallic strip 94 secured against the under side of the bearing 82 by means such as screws 96 passed through the strip and threaded into the bearing 82. The switch assembly bracket further includes an upturnd flange 98 on one end of the strip 94. A graphite bronze support bearing 100 is fixed to the flange 98 and fits over the rod 76 to provide stability for the switch assembly bracket.

The strip 94 is provided with a transverse aperture 102 (Fig. 5) having a knife edge 104. A switch arm 106 in the form of a metal strip fits through the aperture and is provided with a transverse groove 108 receiving the knife edge 104. A spring switch arm 110 carrying a contact 112 is fixed to the arm 106 by a rivet 114 and is insulated from the arm by any suitable or conventional means. A coil spring 116 is compressed between the arm 106 and an ear 118 struck from the surface of the strip 94. The spring is centered by the rivet 114 and by a stud 120 on the ear 118. The tail of the switch arm 106 is trapped behind a depending finger 122 on an angle bracket 124 suitably fixed to the rear reference post 72 by suitable means such as welding or a screw 126. The spring 116 acts to hold the arm 106 against the knife edge 104 and the finger 122.

A substantially U-shaped bracket 128 is secured to the rear reference post by the aforesaid screw 126, with the arm 132 adjacent the post 72 displaced outwardly therefrom. The upstanding free arm of the U-shaped bracket 128 carries a switch contact 134 cooperable with the aforementioned switch contact 112 and insulated from the bracket 128 by any suitable or conventional means. The bracket 128 is somewhat resilient and the exact position of the switch contact 134 is determined by a ceramic pin or button 135 at the end of a rod 136 threaded through an upstanding end 137 of a bracket 139 fixed on the rear post 72 and rotatably passing through a boss 138 on the front wall of the base. A knob 140 is fixed on the end of the rod 136 outside the base for threading the rod in and out to force the contact 134 toward the rear reference post 72 or to allow the contact to move resiliently away from this post. The rod 136 passes through a cylindrical aperture 142 in the front reference post 72.

The heating coils 56 and 68 are connected in series by the wire 70 (Figs. 3 and 6) as previously noted. The nut and bolt 50 are connected to one wire 144 of a conventional two-wire drop cord (it being understood that the two waffle baking units 18 are connected to the drop cord in parallel). The nut and bolt 48 are connected to a wire 146 (Figs. 2, 3, and 6) leading to the contact 112. A wire 148 leads from the cooperating contact 134 to a switch 150 (Figs. 1, 3, and 6) on the front wall of the base. A wire 152 leads from the switch 150 to the other wire of the drop cord.

A pilot light 154 (Figs. 1, 3, and 6) is mounted on the front of the base 12 and is connected across the terminals formed by the nuts and bolts 48 and 50. The pilot light thus is illuminated at all times the heating elements are energized. The pilot light 154 conveniently may be a neon glow lamp so that it may be connected directly across the line without any appreciable absorption of power.

Heating elements 156 and 158 consisting of resistance coils similar to the heating element coils 56 and 68 are mounted in the lid 20 adjacent the grid 24 for heating the grid. The heating coils 156 and 158 are controlled along with the lower coils 56 and 68 and to that end they are connected in series with one another by a wire 160 (Fig. 6) and the series combination is connected in parallel with the series combination of the coils 56 and 68 by wires 162. The wires 162 preferably are protected by a sheath 164 (Fig. 1) which conveniently is in the form of a helically coiled wire.

The grid 32 is bolted to the reference posts 72 and the reference bearing 82 at room temperature. The collar or stop 86 previously has been fixed to the rod 76 a predetermined distance from the front reference post 72 and the spring 90 holds the bearing 82 against the stop. Variations that might otherwise result from tolerances in the spacing of the two holes in the grid and from play between the holes and the screws or bolts thereby are avoided. The support bearing 100 and interconnecting switch assembly bracket insures that the reference bearing 82 will be square on the rod when the screws 80 and 84 are tightened.

The knife edge 104 on the switch assembly bracket and the finger 122 acting on the switch arm 106 normally hold the switch contacts 112 and 134 closed. When a waffle is baked in the unit 18, the grid temperature first drops to the temperature of the batter placed thereon, and then rises with the temperature of the batter. The grid expands rapidly with increasing temperature and the front reference post 72 and the reference bearing 82 move relatively farther apart. The two reference posts 72 remain a substantially constant distance apart due to the substantially zero coefficient of thermal expansion of the "Nilvar" rod 76. Since the bracket 124 is fixed on the rear reference post 72, the finger 122 remains a substantially constant distance from the front reference post 72 and the reference bearing 82 moves toward this finger. The knife edge 104 moves along with the reference bearing 82 and the spring 116 therefore forces the arm 106 to rotate in a counterclockwise direction as seen in Fig. 2 substantially about the finger 122 as a center. After a predetermined temperature of the grid and corresponding spacing between the front reference post 72 and the reference bearing 82 have been reached, the contacts 112 and 134 move apart and the heating coils are deenergized. The pilot 154 is extinguished at the same time and the cook therefore can tell that the waffle is done. The degree of brownness to which the waffle is done can be determined by rotating the knob 140 to thread the rod 136 farther in or out of the base. This determines the position of the contact 134 and consequently determines the exact temperature at which the contacts will open.

The grids can be removed to have the silicone coating renewed, or for other purposes, without disturbing the remainder of the thermostatic control mechanism. The recoated grids or other grids can be reinserted without disturbing the wiring or requiring recalibration of the thermostatic control. The positive, bolted connection of the grid to the remainder of the thermostatic control mechanism insures great ruggedness and proper relative positioning of the separable parts.

Although a particular embodiment of my invention has been shown and described, it is to be understood that this is for illustrative purposes only and does not constitute a limitation on my invention. The invention will be understood as including all that which falls fairly within the spirit and scope of the appended claims.

I claim:

1. A waffle iron or similar cooking utensil comprising a base, a cooking plate having a predetermined coefficient of thermal expansion, means for heating said cooking plate to cook a batter thereon, means for supporting said heating means from said base adjacent said plate, a fixed reference member, means for detachably fastening said fixed reference member to said cooking plate, a second reference member, means having a coefficient of expansion different from that of said cooking plate for maintaining said second reference member spaced from said first reference member, a movable reference member, means for detachably fastening said movable reference member to said cooking plate, means controlled by relative movement between said movable reference member and one of the first two mentioned reference members for controlling operation of said heating means, and means independent of said plate for supporting at least one of said reference members from said base to support said cooking plate.

2. A waffle iron or similar cooking utensil comprising a base, a cooking plate having a predetermined coefficient of thermal expansion, a fixed reference member, means for detachably fastening said fixed reference member to said cooking plate, a second reference member, means having a substantially zero coefficient of thermal expansion for maintaining said second reference member at a substantially constant distance from said fixed reference member, a movable reference member, means for detachably fastening said movable reference member to said grid, means for heating said cooking plate, means for supporting said heating means from said base adjacent said plate, means actuated by relative movement between said movable reference member and one of the first two mentioned reference members as the dimensions of said cooking plate change with temperature to control operation of said heating means, and means independent of said plate for supporting at least one of said reference members from said base to support said cooking plate.

3. A waffle iron or similar cooking utensil comprising a base, a cooking plate having a predetermined coefficient of thermal expansion, means for heating said cooking plate to cook a batter thereon, means for supporting said heating means from said base adjacent said plate, a fixed reference member, means for detachably fastening said fixed reference member to said cooking plate, a second reference member, a rod having a coefficient of expansion different from that of said cooking plate, means for fixing said second reference member on said rod; for supporting said second reference member in spaced relation to said fixed reference member, a movable reference member slidable on said rod, and normally spaced a predetermined distance from said fixed reference member by abutment against said second reference member, means for detachably fastening said movable reference member to said cooking plate, means actuated by relative movement between said movable reference member and one of the first two mentioned reference members as said cooking plate changes dimensions with temperature to control operation of said heating means, and means independent of said plate for supporting at least one of said reference members from said base to support said cooking plate adjacent said heating means.

4. A waffle iron or similar cooking utensil comprising a base, a cooking plate having a predetermined coefficient of thermal expansion, electrical resistance heating means for heating said cooking plate to cook a batter thereon, a fixed reference member, means for detachably fastening said fixed reference member to said heating plate, a second reference member, means having a predetermined coefficient of thermal expansion different from that of said cooking plate for maintaining said reference members in spaced relation, a movable reference member, means for detachably fastening said movable reference member to said cooking plate, said movable reference member when detached from said plate being spaced a predetermined distance from said fixed reference member by abutment against said second reference member, a pair of normally closed switch contacts connected to said electrical resistance heating means for supplying power to said heating means, means operated by said movable reference member and one of said fixed and said second reference members to open said switch contacts to deenergize said heating means when said movable reference member and said one reference member have reached a predetermined spacing corresponding to a predetermined temperature of said cooking plate, and means for supporting at least one of said reference members from said base to support said cooking plate in juxtaposition to said electrical resistance heating means.

5. A waffle iron or similar cooking utensil as set forth in claim 4 and further including manually operated means for moving at least one of said switch contacts to vary the cooking plate temperature at which the contacts open.

6. A waffle iron or similar cooking utensil comprising a base, a cooking plate having a predetermined coefficient of thermal expansion, means for heating said cooking plate to cook a batter thereon, a fixed reference member, means for detachably fastening said fixed reference member to said cooking plate, a second reference member, a rod having a coefficient of expansion different from that of said cooking plate for maintaining said reference members in spaced apart relation, a movable reference member slidable on said rod and normally spaced a predetermined distance from said fixed reference member by abutment against said second reference member, a bearing member slidable on said rod, means for maintaining said bearing member and said movable reference member in spaced apart relation to stabilize said movable reference member, means for detachably fastening said movable reference member to said cooking plate, means operated by relative movement between said movable reference member and one of the first two mentioned reference members for controlling operation of said heating means, and means for supporting at least said fixed reference member from said base to support said cooking plate adjacent said heating means.

7. A waffle iron or similar cooking utensil comprising a base having a floor, a cooking plate having a predetermined coefficient of thermal expansion, a support upstanding from said floor, a second support upstanding from said floor, a rod having a substantially zero coefficient of expansion between said supports for maintaining said supports in substantially constant spaced apart relation, a reference member slidable on said rod, rotary fastening means for detachably fastening said cooking plate to one of said supports, rotary fastening means for detachably fastening said cooking plate to said reference member, a member adjustably fixed on said rod for positioning said slidable reference member by abutment therewith when said slidable reference member is detached from said plate, electrical heating means, means for supporting said electrical heating means from said base in juxtaposition to said cooking plate to cook a batter thereon, a lever arm, means on one of said supports and on said reference member for determining the position of said lever, a switch contact carried by said lever, a second switch contact, means for supporting said second mentioned switch contact from said base for cooperation with said first mentioned switch contact, said switch contacts being connected to said electrical heating means and normally being closed for energizing said heating means and being opened by the lever position determining means when said reference member and said one support reach a predetermined spacing corresponding to a predetermined temperature of said cooking plate, and manually operable means for moving the second mentioned switch contact to determine the exact temperature of said cooking plate at which said contacts open.

8. A waffle iron or similar cooking utensil comprising a base, a cooking plate having a predetermined coefficient of thermal expansion, means for heating said cooking plate to cook a batter thereon, means for supporting said heating means adjacent said plate for heating the same, a fixed reference member, means for detachably fastening said fixed reference member to said cooking plate, a second reference member, means having a coefficient of expansion different from that of said cooking plate, means for fixing said first and second reference members to said last named means, a movable reference on said last named means and positioned by abutment against one of said first and second reference members, means for detachably fastening said movable reference member to said cooking plate, means controlled by relative movement between said movable reference member and one of the first two mentioned reference members for controlling operation of said heating means, and means independent of said plate for supporting at least of one said reference members from said base to support said cooking plate adjacent said heating means.

9. A waffle iron or similar cooking utensil comprising a base, a cooking plate having a predetermined coefficient of thermal expansion, means for heating said cooking plate to cook a batter thereon, means supporting said heating means from said base independently of said cooking plate, a reference member having a coefficient of thermal expansion different from that of the cooking plate, means supporting said reference member and including a pair of attachment members detachably fastened to said cooking plate at spaced points, and thermostatic control means including the said cooking plate and switch means operable in response to relative movement between said cooking plate and said reference member for controlling operation of said heating means.

10. A waffle iron or similar cooking utensil as claimed in claim 9, wherein one of said attachment members is movably mounted on the said reference member in operative association with said switch means.

References Cited in the file of this patent
UNITED STATES PATENTS

| | | |
|---|---|---|
| 1,907,199 | Hurxthal | May 2, 1933 |
| 1,963,655 | Fichtner | June 19, 1934 |
| 2,024,856 | Graham | Dec. 17, 1935 |
| 2,102,879 | Benson | Dec. 21, 1937 |
| 2,237,147 | Ireland | Apr. 1, 1941 |
| 2,250,966 | Propernick et al. | July 29, 1941 |
| 2,300,061 | Purpura | Oct. 27, 1942 |
| 2,430,715 | Grayson | Nov. 11, 1947 |